Dec. 15, 1942.    L. McGRADY    2,304,840
CAR REPLACER
Filed April 14, 1941    2 Sheets-Sheet 1
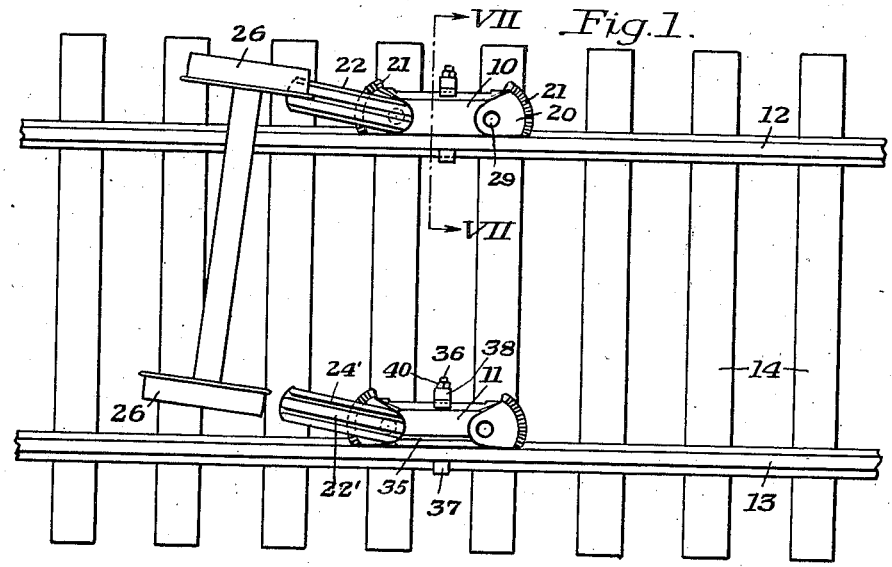
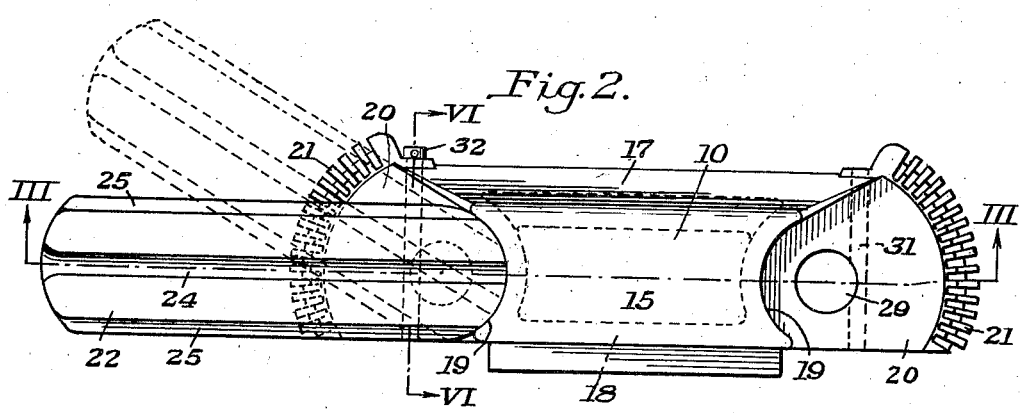
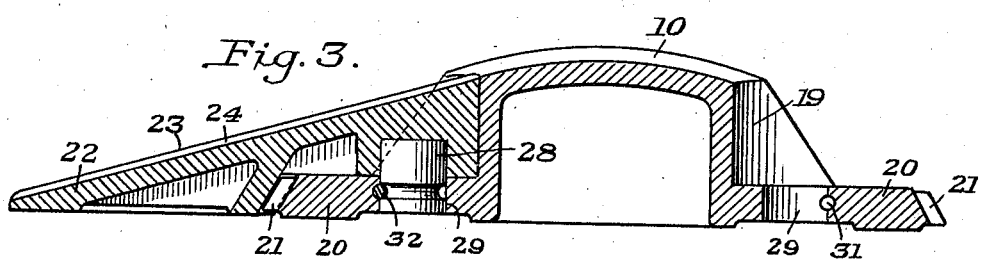
INVENTOR
Lester McGrady
by his attorneys
Stebbins and Blenko Dec. 15, 1942.    L. McGRADY    2,304,840
CAR REPLACER
Filed April 14, 1941    2 Sheets-Sheet 2
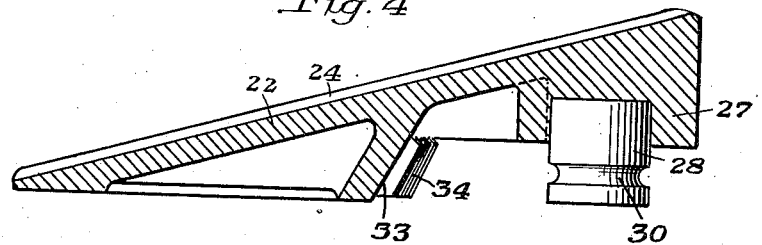
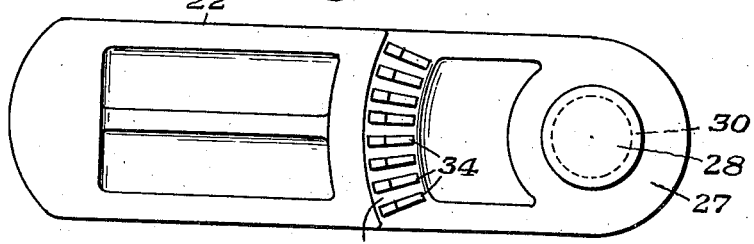
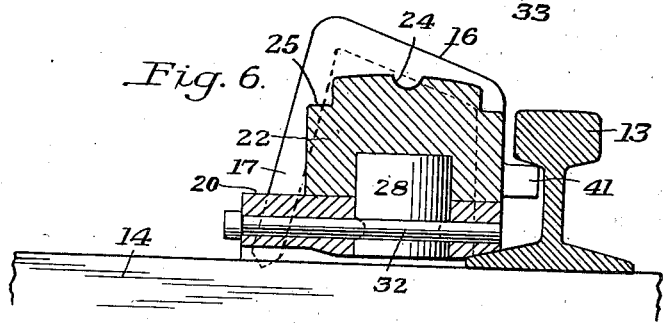
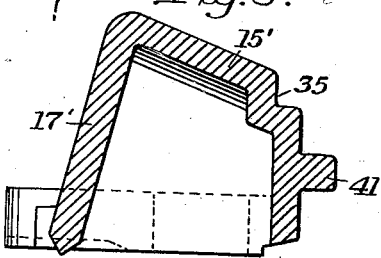
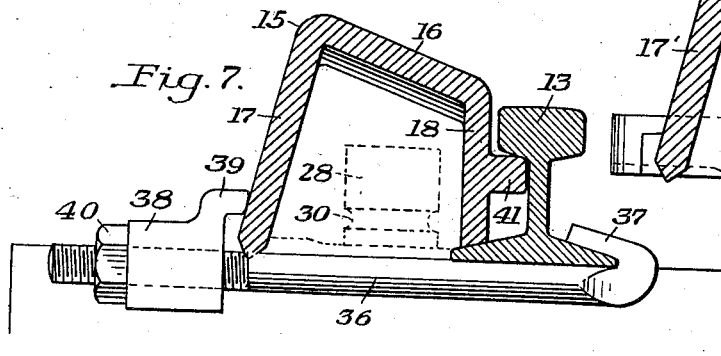
INVENTOR
Lester McGrady
by his attorneys
Stebbins and Blenko Patented Dec. 15, 1942

2,304,840

UNITED STATES PATENT OFFICE 2,304,840

CAR REPLACER

Lester McGrady, Brownsville, Pa., assignor of one-half to S. W. Huston, Brownsville, Pa.

Application April 14, 1941, Serial No. 388,423

1 Claim. (Cl. 104—172)

This invention relates to car replacers and, particularly, to a car replacer of the type including a body portion adapted to lie alongside a track rail and having a sloping wing portion pivoted thereto adapted to guide the wheels of a car truck upwardly onto the body portion and thence onto the track rails.

Car replacers of the general type above mentioned have been known heretofore but have not functioned with entire satisfaction because of the difficulty in maintaining the wing portions in proper position relative to the body portion, in order to cause the wheels of a car truck to mount the rails. I have invented a novel form of replacer having means for locking the pivoted wing portions relative to the body portions, thereby preventing accidental displacement of the former when engaged by the wheels of a car truck.

In a preferred embodiment of the invention, my replacer comprises a body portion, preferably in the form of a casting, having a pocket adjacent each end and a shelf-like extension projecting therebelow. The body portion is adapted to be secured to a track rail, either inside or outside thereof, adjacent the truck of a car which has been derailed. Wing portions have depending pivot pins secured thereto within hubs fitting in the pockets at the ends of the body portion. The shelf-like extensions are bored to receive the pivot pins. Teeth are formed in a conical surface at the end of the extensions and the wing portions have a correspondingly shaped tooth portion adapted to have interlocking engagement therewith. When the teeth are in engagement, the wing portions are held against angular displacement. They may be adjusted for different positions of the derailed car wheels, however, merely by raising them slightly from the body portion to disengage the cooperating teeth.

Further novel features and advantages of the invention will be made clear during the following detailed description and explanation thereof, which refer to the accompanying drawings illustrating the preferred embodiment. In the drawings, Figure 1 is a diagrammatic plan view showing a pair of my car replacers in use for the replacement of the wheels of a derailed truck;

Figure 2 is a plan view showing one of the replacers illustrated in Figure 1;

Figure 3 is a longitudinal vertical section through the replacer of my invention taken substantially along the plane of line III—III of Figure 2;

Figure 4 is a similar section to enlarged scale through the wing portion alone;

Figure 5 is a bottom plan view of the wing portion;

Figure 6 is a transverse sectional view taken substantially along the plane of line VI—VI of Figure 2;

Figure 7 is a transverse sectional view taken substantially along the plane of line VII—VII of Figure 1; and Figure 8 is a partial transverse section similar to Figure 7 through the body portion of the other replacer.

Referring now in detail to the drawings, my invention comprises a pair of replacers indicated generally at 10 and 11 which are identical except for certain slight differences which will be particularly pointed out hereinafter. With these exceptions, the detailed description will be confined to the replacer 10. As shown in Figure 1, the replacer 10 is adapted for use on the outside of a track rail 12, while the replacer 11 is intended to be used on the inside of the other track rail 13, both replacers being supported on the ties 14 to which the track rails are secured.

Referring now more particularly to Figures 2 through 7, the replacer 10 comprises a body portion which may conveniently be a unitary casting, including a sloping top 16 and side walls 17 and 18. The body portion 15 has rounded pockets 19 formed at each end thereof. Shelf-like bearing extensions 20 project longitudinally below the pockets 19. The outer ends of the extensions 20 are of conical form and are provided with teeth 21.

In addition to the body portion 15, the replacer 10 includes a wing 22. The wing has a sloping surface 23 provided with a central flange groove 24 and edge recesses 25, whereby the wheel of a derailed truck may climb upwardly from a position such as that illustrated diagrammatically in Figure 1 by the wheels 26, to a position on the sloping tops 16 of the two replacers, from which the wheels slide downwardly onto the rails 12 and 13.

The wing portion 22, adjacent its high end, has a hub 27 adapted to fit in one of the pockets 19 and to bear on one of the shelf-like extensions 20. A pivot pin 28 is fixed in the hub 27 and is adapted to enter a vertical bore 29 in either of the extensions 20. The pin 28 has an annular groove 30 therearound which alines with a transverse hole 31 through each of the extensions 20 when the wing portion is applied thereto. A removable keeper pin 32 inserted into the hole 31 thus serves to hold the wing portion 22 in cooperating engagement with the body portion 15.

The wing portion 22 has a conical undersurface 33 provided with teeth 34 adapted to mesh with the teeth 21 on the ends of the extensions 20 when the wing portion is placed thereon. It will be evident that, when the wing portion is in place, as shown in Figures 1 and 2, the meshing of the teeth 34 with the teeth 21 prevents angular movement of the wing portion relative to the body portion. If it is desired to adjust the wing portion relative to the body portion, it is only necessary to remove the keeper pin 32 and raise the wing portion until the teeth 34 clear the teeth 21. The wing portion may then be swung to the desired angle and when properly adjusted, lowered onto the bearing extension 20 and again locked thereto by the insertion of pin 32.

The replacer 11 differs from the replacer 10 in that the body portion 15' thereof has an edge recess 35 along the lower side thereof, adapted to accommodate the flange of a truck wheel. The wing portion 22' of the replacer 11, furthermore, has two flange grooves 24' spaced inwardly from the sides thereof, instead of the central groove and edge recesses of the wing portion 22.

The utility of the invention may be readily explained by reference to Figure 1. In case of derailment, the replacer 10 is positioned to cooperate with the wheel on the outside of the track and the replacer 11 is adjusted to cooperate with the wheel between the rails. As shown in Figure 1, the replacers are positioned as closely as may be to the wheels and should be kept approximately in alinement transversely of the track. I provide special means in the form of hook bolts 36 for securing the replacers to the track rails respectively. Each bolt 36 has a hook portion 37 adapted to engage one of the rail flanges and is provided with a sleeve 38 having a lug 39 adapted to engage the side wall 17 of the body portion 15 or 15'. A nut 40 on the threaded end of the bolt 36 permits the sleeve 38 to be forced against the body portion of the replacer, thereby firmly anchoring it to the rail. A longitudinal rib 41 on the body portion projects laterally therefrom for engagement with the rail web.

Before securing the replacers in position as shown in Figure 1, the wing portions thereof are adjusted, as previously explained, to approximately the proper angle for cooperation with the wheels of the derailed truck. The wing portion of the replacer 10 is positioned so that its central groove 24 will receive the flange of the wheel on the outside of the track. Similarly, the wing portion of the replacer 11 is positioned so that one of its grooves 24' is in alinement with the flange of the wheel 26 between the rails.

When the replacers are finally in position, all parts thereof are held firmly in position against the possibility of accidental displacement. The body portions of the replacers are anchored to the rails by the hook bolts 36, while the wing portions are secured to the body portions by the keeper pins 32 and prevented from rotation thereon by the engagement of the teeth 21 and 34.

When the replacers have been thus adjusted and positioned, the car of which the derailed truck is part, is pushed or pulled so that the wheels 26 climb up the wing portion 22. The wheels are positively guided by the flange grooves as they ascend the wing portions. When they reach the smooth sloping tops 16 of the body portions of the replacers, the wheels slide downwardly toward the rails. The edge recess 35 on the body portion of the replacer 11 permits the flange of the wheel 26 which was between the rails to extend downwardly below the head of the rail to which the replacer 11 is secured. The flange of the other wheel, of course, must slide across the head of the rail 12 and is assisted in doing so by the shape of the body portion 15 thereof, as shown in Figures 6 and 7.

When one pair of wheels of a derailed truck has thus been replaced, the other wheels thereof are similarly guided into proper position on the rails.

Since both ends of the body portions of the replacers of my invention are adapted to receive the wing portions, the replacers may be used in the reverse of the positions shown in Figure 1. It will be obvious, furthermore, that either of the replacers may be applied to either rail, but the replacer 10 should be used to replace the wheel which is on the outside of the track when derailed and the replacer 11 for the wheel inside the track.

It will be apparent from the foregoing description and explanation that the invention is characterized by important advantages over car replacers as known heretofore, particularly in respect to the means for positively holding the wing portions in predetermined angular relation to the body portions, and preventing accidental displacement thereof upon engagement of the truck wheels therewith. This feature materially expedites the replacing operation since it obviates the necessity for readjusting the wing portions on accidental displacement thereof, as has been necessary heretofore.

Further advantages of the replacer of my invention reside in its rugged design and great strength. The improved features characterizing my replacers, furthermore, do not add greatly to the cost thereof as compared with previous replacing devices.

Although I have illustrated and described but a preferred embodiment of the invention, it will be recognized that changes in the details of various parts or their arrangement may be made without departing from the spirit of the invention or the scope of the appended claim.

I claim:

A car replacer comprising a body portion adapted to be positioned alongside a rail, a pocket formed in one end of said portion, a shelf-like bearing extension below said pocket, a wing portion removably pivoted on said extension, said wing portion having a hub fitting in said pocket and normally bearing on said extension, a conical toothed surface on said extension, and a correspondingly shaped, co-operating toothed space on said wing portion.

LESTER McGRADY.

CERTIFICATE OF CORRECTION.

Patent No. 2,304,840.　　　　　　　　　　　　　　　December 15, 1942.

LESTER McGRADY.

It is hereby certified that error appears in the printed specification of the above numbered patent requiring correction as follows: Page 2, second column, line 66, in the claim, for "space" read --surface--; and that the said Letters Patent should be read with this correction therein that the same may conform to the record of the case in the Patent Office.

Signed and sealed this 16th day of February, A. D. 1943.

(Seal)

Henry Van Arsdale,
Acting Commissioner of Patents.